United States Patent [19]

Krofta

[11] 4,157,952

[45] Jun. 12, 1979

[54] APPARATUS FOR DEINKING WASTE PAPER PULP

[75] Inventor: Milos Krofta, Lenox, Mass.

[73] Assignee: Lenox Institute for Research, Lenox, Mass.

[21] Appl. No.: 889,944

[22] Filed: Mar. 24, 1978

[51] Int. Cl.² .............................................. B03D 1/24
[52] U.S. Cl. ................................ 209/170; 210/221 P; 162/5
[58] Field of Search ............................... 209/170, 168; 210/221 R, 221 P, 221 M, 44; 162/5, 4; 8/156

[56] References Cited

U.S. PATENT DOCUMENTS

| | | | |
|---|---|---|---|
| 2,248,177 | 7/1941 | Karlstrom | 210/205 |
| 3,642,617 | 2/1972 | Brink et al. | 209/170 X |
| 3,769,207 | 10/1973 | Baer | 209/170 X |

FOREIGN PATENT DOCUMENTS 115971  3/1946  Sweden ........................... 210/221 PM

*Primary Examiner*—Ralph J. Hill
*Attorney, Agent, or Firm*—Edward T. Connors

[57] ABSTRACT

Apparatus for de-inking waste paper pulp using a foam flotation process in which the deinked slurry is to be recycled for the production of paper. The old paper is pulped (slushed), mixed with water and flotation- and other chemicals, to produce a slurry which is introduced into the flotation tank. Movement of the slurry through the flotation tank is achieved by the positioning of one or more water injector nozzles with air inlets which causes a swirling rotation from the injector towards a central outlet. Froth or foam bubbles float to the surface of the slurry carrying ink particles. A baffle plate leads the floated froth or foam and ink particles to a vacuum actuated outlet.

1 Claim, 2 Drawing Figures

APPARATUS FOR DEINKING WASTE PAPER PULP

BACKGROUND OF THE INVENTION

Economic conditions demand the recycling of used materials. In the production of paper it has been known that used paper may be deinked, bleached, and made into a slurry suitable for the production of new paper. The proportion by weight of printing inks in the paper to be recycled is relatively small and the ink must be removed to produce paper of the desired brightness.

The technology involved in deinking according to the froth flotation process has been known for some time. Presorted waste paper is defibred by means of a pulper in preheated water with the addition of suitable deinking chemicals such as alkalis, bleaching agents, collectors, and foamers. By the action of the various chemicals the adhesives in the printing inks are removed so that the inks can be separated from the fibers.

The printing inks are removed in the so-called froth flotation cells operating under the principle of froth floation. The treatment of the waste paper slurry with chemicals prepares the materials for the froth flotation process. The slurry is aerated and the air bubbles, which have been stabilized by the addition of flotation agents, rise through the slurry and pigments accumulate on the surface of the bubbles due to the differing wetability and are carried to the surface of the liquid. The ink particles accumulate in the foam or froth formed over the surface of the liquid and can be skimmed off from the fiber suspension.

DESCRIPTION OF THE PRIOR ART

Apparatus has heretofore been provided for the removal of the foam from the slurry. In some cases this apparatus has included a plurality of stacked deinking towers in which the slurry has been admitted through an inlet pipe while the air has been introduced through cloth or other screens so as to produce a plurality of small bubbles passing upwardly through the slurry. In some cases such constructions have been found disadvantageous because of the difficulty of suitably cleaning the screens for the formation of the small bubbles.

The presently existing machines consist of a plurality of rather small capacity separated flotation cells which operate in series, therefore requiring a large number of units to obtain a production capacity usually needed in the waste paper deinking systems. Each of the presently employed units also requires a single mechanical agitator and foam scraper. By reason of their construction such units generally involve expensive fabrication costs.

SUMMARY OF THE INVENTION

The present invention aims to overcome the difficulties and disadvantages of prior constructions by providing an improved apparatus for deinking of waste paper slurry in which the air is introduced into the inlet stream of waste paper slurry by means of a water/air injector. A froth flotation tank is utilized with the jet so positioned as to feed the slurry tangentially into the tank so that the force produced by the outlet stream of aerated slurry causes a spiral swirling or circulation of the slurry in the flotation tank. The outlet for the deinked slurry is provided at the center of the tank and is in the form of a regulatable overflow weir. Thus, as the aerated slurry enters the tank, by proper positioning of the injector nozzle, it is moved in a spiral function around the tank towards the center thereof. As the slurry circulates it releases bubbles which float to the surface carrying the ink particles therewith. It thus may be seen that there is a continuing bubbling action along the course of the fluid as it spirals towards the center of the tank at which time the bubbles have mainly floated to the surface and taken with them the ink particles in the slurry.

At the center portion of the tank the deinked slurry passes over the overflow weir and outwardly, leaving the foam or bubbles on the top of the remaining slurry in the tank. A barrier or baffle plate is positioned across the top of the tank, preferably behind the location of the nozzle or nozzles, so that as the liquid is rotated around the tank by the discharge action of the injectors, the foam carried on the surface of the liquid is blocked by the baffle plate. Vacuum means are provided at the baffle plate to suck away the froth into a discharge outlet. Advantageously, the vacuum action increases the differential pressure of the air in the bubbles causing the bubbles to break, thus the discharge is mainly liquid containing the ink particles and water.

Further, the present invention overcomes the disadvantages of the prior art in that the flotation cell may be built in the form of a low head, large diameter cylindrical tank inasmuch as the generally spiral flow of the slurry results in a longer path through the tank and thus a longer period for the desired bubble formation.

DESCRIPTION OF THE PREFERRED EMBODIMENT

Figure 1:
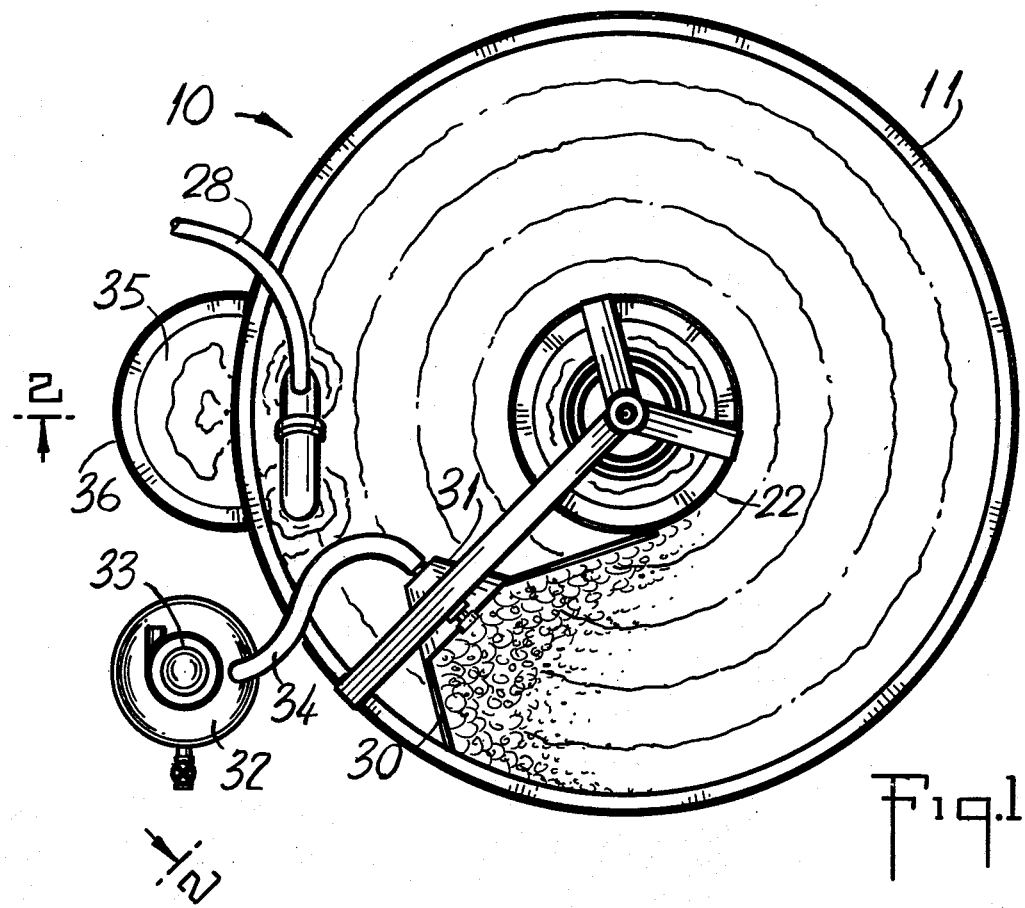
FIG. 1 is a top view of the apparatus for deinking waste paper in accordance with the invention.
Figure 2:
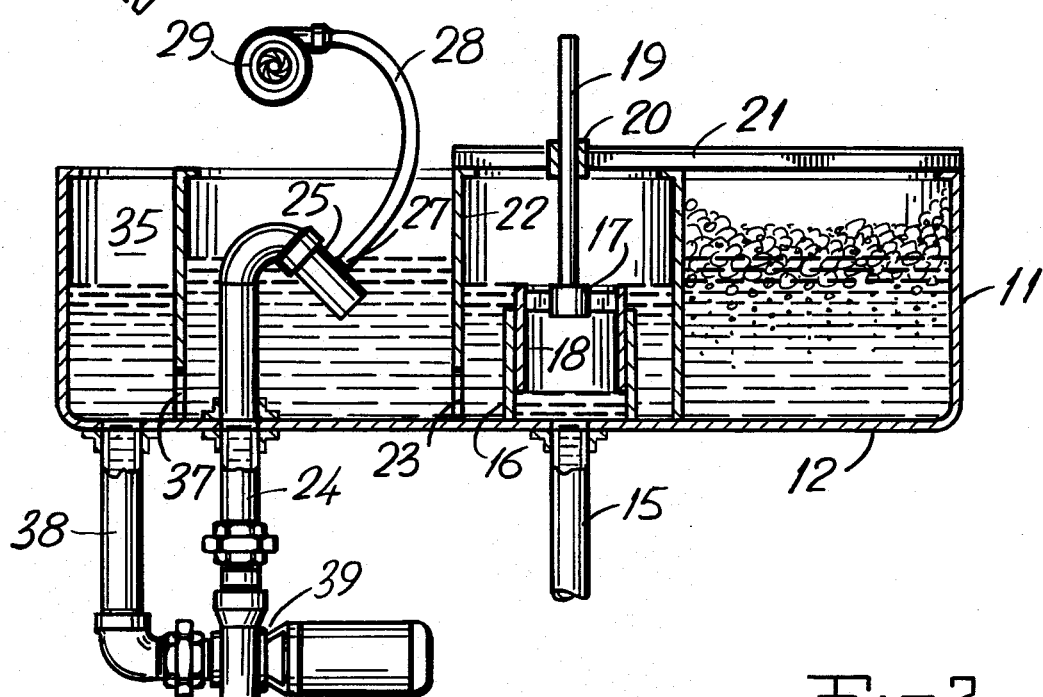
FIG. 2 is a vertical sectional view taken along the line 2—2 of FIG. 1.

Referring to the drawings there is shown in FIGS. 1 and 2 apparatus for deinking waste paper pulp utilizing froth flotation. The apparatus included a tank 10 having a side wall 11 and a generally flat bottom 12. The diameter of the tank is large compared with the depth of the slurry within the tank, in fact, a very satisfactory depth of the slurry is of the order of 16 inches irrespective of the diameter of the tank which may vary in diameter from 6 to 50 feet. At the center of the bottom of the tank is positioned an outlet pipe 15 located at the bottom of a regulated overflow weir compartment formed with a generally cylindically shaped upwardly extending partition wall 16. Extending downwardly into the tank is a weir level control member 17 having downwardly depending side wall 18 adapted to fit within the partition wall 16. The weir level control member 17 may be raised and lowered by a rod 19 suitably held in position in a bushing member 20 supported by a frame member 21 carried on the top of a cylindrical partition member 22 having an opening 23 therein. A slurry pipe 24 extends upwardly through the bottom 12 of the tank 10. At its upper end is positioned a water/air injector nozzle 25 having a downwardly directed discharge and an air inlet fitting 27. Air is supplied to the injector nozzle 25 through a pipe 28 connected to a blower 29. The injector nozzle 25 is positioned within the tank directed downwardly at an angle varying from 30 to 60 degrees, and the injector is directed tangentially to a radius of the tank at an angle of 60 to 90 degrees. The tip of the nozzle is from 1 to 5 inches below the surface of the slurry, preferably about 4 inches. The pressure of the slurry in the inlet may vary from 10 to 20 pounds per square inch. The air produced by the blower may vary from 1 to 5 inches water column pressure. The volume of the air introduced is 2 to 4 volumes atmospheric pressure per unit volume of water. At the top of the tank is a baffle member 30 which extends from the inner side of the tank wall 11 substantially across the top of the tank and supported by the partition 22. Positioned adjacent to the baffle or preferably positioned within the baffle is the inlet 31 of a vacuum suction tank 32 powered by a suction blower 33 and connected to the inlet 31 by an inlet pipe 34.

The tank 10 is provided with a mixing compartment 35 defined by an extension wall 36 on the outer side of the wall 11. A fluid passage opening 37 leads through the wall 11 into the tank 10, and an outlet pipe 38 is connected to a pump 39. Slurry and chemicals are added to the compartment 35 in any suitable manner. Slurry enters through the opening 37 and further mixes with the added chemicals. The capacity of the tank may be increased by providing a plurality of injectors positioned in spaced relationship.

In the operation of the apparatus as shown the incoming slurry is directed tangentially and downwardly from the outside of the tank forcing the slurry to rotate in the tank in a generally spiral form leading towards the center of the tank where the regulated outlet is arranged. The jet action of the incoming slurry provides the required agitation and movement of the slurry in the tank without the use of special agitators. The foam produced by the bubbles arising from the spirally moving column of slurry rises to the surface of the slurry and is carried rotationally by the movement of same, thus piling up behind the the baffle 30 where it is drawn into the inlet 31 of the vacuum tank. As stated before, by reason of the decreased pressure in the vacuum tank the bubbles collapses producing a residue of ink particles in water, the air being discharged.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:
1. Apparatus for deinking waste paper pulp slurry using the foam flotation process comprising
    a cylindrically shaped tank open at its upper end in which the diameter of the tank is large compared to the depth of slurry therein,
    inlet slurry and air injection nozzle means positioned adjacent the top outer edge of said tank in said tank, said nozzle being directed downwardly at an angle ranging from thirty to sixty degrees, said nozzle being directed tangentially at an angle from sixty to ninety degrees so that the discharged slurry and air is moved around the tank in a swirling rotation,
    deinked slurry outlet means regulating the slurry level and positioned at the center of said tank,
    a foam baffle member extending substantially across the top of said tank from said central outlet means to the edge of said tank,
    vacuum foam inlet means positioned in said foam baffle member and located so as to be below the normal level of foam and above the liquid level of slurry,
    and means adapted to supply slurry to said injection nozzle at a pressure of the order of ten to twenty pounds per square inch, and means adapted to supply air to said injection nozzle at a pressure of the order of one to five water column inches pressure so that the volume of the air supplied is at a ratio of the order of two to four times the volume of slurry.

* * * * *